Patented July 5, 1949

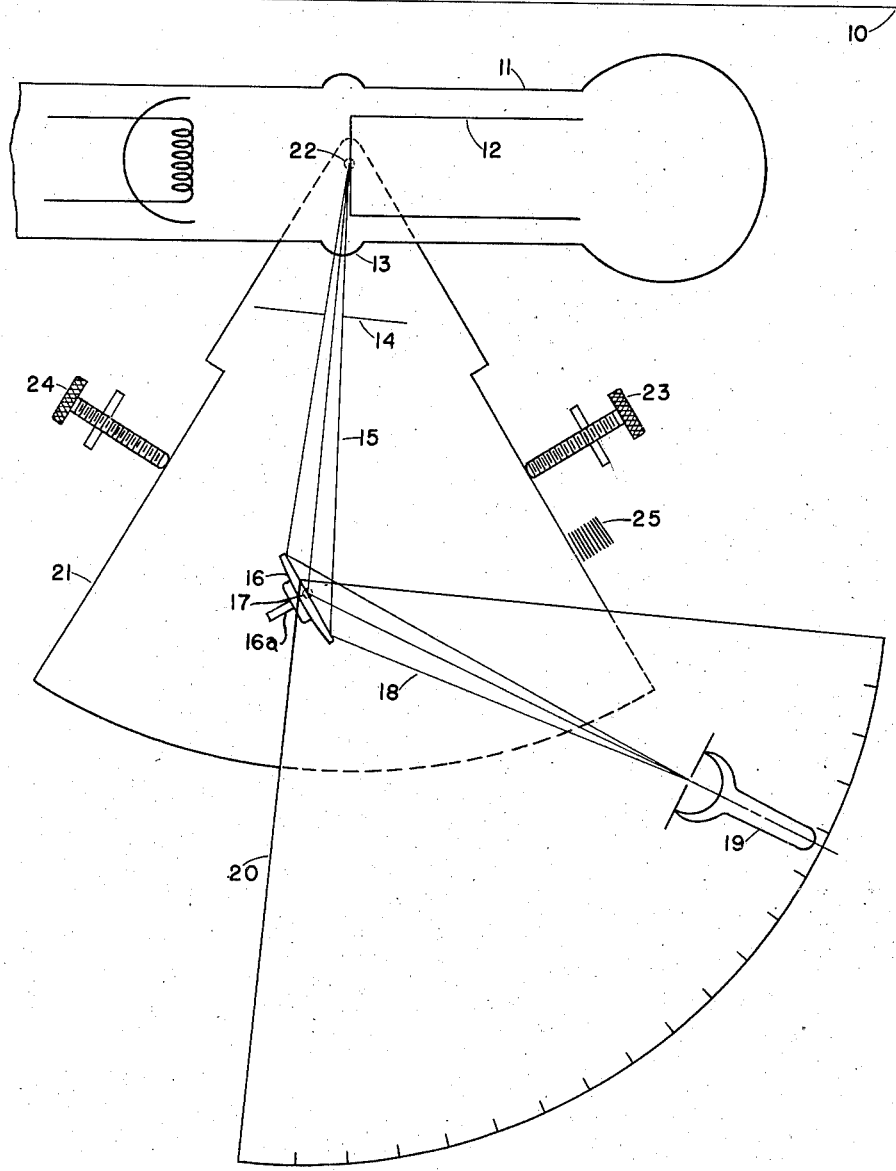

2,474,835

UNITED STATES PATENT OFFICE 2,474,835

X-RAY SPECTROMETER

Herbert Friedman, Arlington, Va.

Application July 14, 1945, Serial No. 605,162

3 Claims. (Cl. 250—52)

(Granted under the act of March 3, 1883, as amended April 30, 1928; 370 O. G. 757)

My invention relates to a method and apparatus for taking X-ray diffraction patterns and particularly it relates to an apparatus adapted to the production of X-ray diffraction patterns of much improved intensity and their rapid detection and measurement.

In so far as this application discloses subject matter common to my prior-filed applications, Serial Numbers 452,599 and 553,262, filed July 28, 1942 and September 8, 1944, respectively, now Patents 2,386,785 and 2,428,796 respectively, it may be considered a continuation-in-part thereof.

The general adoption of X-ray diffraction technique in the study and analysis of chemical compositions has been hindered by the fact that available methods for measuring the relative intensities of patterns and lines in the patterns have been quite slow. For example, the photographing of an X-ray diffraction pattern requires an exposure of many hours in order to bring out some of the weaker lines in the pattern being studied. In my prior filed application, Serial No. 452,599, I have disclosed a rapid scanning method for measuring the intensity of an X-ray diffraction pattern in which the radiation sensitive element is a Geiger-Muller counter having a very high quantum efficiency. By using such a counter as a detector it is possible to scan an X-ray diffraction pattern of relatively low intensity in a short period of time.

The problem of studying materials by measuring the intensities of their X-ray diffraction patterns has many aspects, an important one of which is the production of a pattern of conveniently measurable intensity. Accordingly, it is an object of this invention to provide a method and apparatus for producing X-ray diffraction patterns of high intensity without the use of voltages on the X-ray tube which are higher than those commonly used.

In X-ray spectrometric work, frequently a large portion of the intensity of the radiation is lost by absorption of the radiation in air. Hence, it is another object of my invention to provide an X-ray spectrometer in which the distances between the source of the X-rays, the specimen being examined, and the detector are reduced to a minimum, thereby assisting in the production of patterns of increased intensity.

It is the primary object of my invention to provide an X-ray spectrometer in which the anode of the X-ray tube itself can be used as the first line-source of X-rays for irradiating the specimen to be examined, instead of a slit assembly which constitutes said line-source in the conventional spectrometer apparatus.

It is still another object of my invention to provide an X-ray spectrometer in which the anode of the X-ray tube itself can be used as a variable-width line-source of X-rays thereby eliminating the need for at least one slit in the definition or collimation of a beam of X-rays.

Other objects and advantages of my invention will in part be obvious and in part appear hereinafter.

My invention accordingly comprises the method of producing X-ray diffraction patterns of improved intensity and includes the several steps and the relation of one or more of such steps to each of the others, and the improved X-ray spectrometer adapted to produce intense diffraction patterns according to my method which apparatus embodies the features of construction, combinations of elements and arrangement of parts which are adapted to effect such steps, all as exemplified in the following detailed disclosure, and the scope of the invention will be indicated in the claims.

In the drawing I have shown, diagrammatically, a plan view of the table of my improved X-ray spectrometer in order to show the interrelationship of the parts.

Referring to the drawing, 10 represents the table top of an X-ray spectrometer, 11 an X-ray tube, 12 the tube anode and 13 a tube window. Close to the window there is mounted a variable slit 14 which is used to regulate the divergence of the X-ray beam 15 in order to provide for the irradiation of the desired substantial portion of specimen 16 as indicated, which specimen is mounted in a holder 16a having a center of rotation identified as 17 in the drawing. In conventional apparatus a second slit (or aperture) would be necessary between the anode and the divergence-regulating slit to form a line (or point) source of radiation. The diffracted beam, 18, of X-rays is intercepted and its intensity measured by detector 19, which is mounted in a manner such that it can be swept through a ninety degree arc defined by the support 20. The support 20 has as a center of rotation for detector 19 the same center of rotation as does the specimen 16, namely, point 17.

The support 20, specimen 16 and detector 19 are mounted on base 21 which is mounted on the spectrometer table to have a center of rotation coincident with an axis 22 passing through the tube anode 12. The degree of rotation of the base 21 about the tube anode or the angle at which specimen 16 "sights" the tube anode through the tube window is regulated and controlled by set screws 23 and 24, which can be calibrated to give an actual measure of the angle of "sight" as indicated by markings 25.

In the construction of X-ray tubes it is well-known practice to attempt to focus the high speed electron stream originating at the tube filament as a line on the anode surface. The result is accomplished with greater or lesser degrees of success in different X-ray tubes, but the activated area is always large enough to necessitate the use of a slit assembly in order to achieve a line-source of radiation in conventional spectrometers. The area of the anode surface activated by the bombarding electrons is a source of X-rays every point of which radiates in all directions from the face of the anode.

Conventional X-ray diffraction apparatus have a first slit forming a line source of radiation approximately at the point at which slit 14 has been shown in the drawing and a second slit, to control the beam divergence farther along the beam axis. In the present invention by sighting the X-ray tube anode at a low angle I have been able to use radiation from an appreciable area of the anode as substantially a line, or point-source of diverging rays in one plane as indicated in the drawing where such one plane is the plane of the paper. I thus eliminate the need for the first slit thereby exposing the specimen to a much more intense irradiation and producing a more intense diffraction pattern.

By establishing several centers or axes of rotation of the specimen and support 20 (several positions of point 17) in an X-ray spectrometer substantially as described, I have been able to construct a simple, modified X-ray spectrometer capable of giving X-ray diffraction patterns with intensities increased by a factor of ten or more without the application of additional voltage to the X-ray tube. Provision of base 21, with an axis of rotation passing through the face of the anode of the X-ray tube defining the center of rotation of the base 21 permits pivoting of the specimen and detector about the axis 22 as a unit. In the drawing, as it is shown, the base carrying the specimen holder and the detector support has been set to an angle such that the X-ray beam is being sighted by the specimen at an angle of about 5° for convenience in representation. Actually the angle of sight can be substantially smaller and, in fact, it is preferable to have it as close to zero as possible. In practice I have found that angles of sight of about 2° to 3° represent good working angles.

The advantages of constructing an X-ray spectrometer to provide for a variable angular relationship among the tube anode, the specimen holder and the diffracted beam detector accrue largely as resulting in patterns of increased intensity. The employment of the tube anode as a first slit source (with respect to the specimen "sighting" said anode at a low angle) by eliminating one of the slits commonly used in X-ray spectrometers, permits use of the anode of the tube itself as a primary source with consequent strong irradiation. Likewise the sighting of the X-ray tube anode at a small angle permits a more intense irradiation of the specimen. Both of these features make a substantial contribution to increasing the intensity of the pattern with the net result that pattern intensities increased by a factor of at least ten are readily obtained. By sighting the tube anode at angles of 2° to 3° in an apparatus constructed according to the description, I have readily been able to obtain diffraction patterns having intensities increased by a factor of ten and more.

Since different embodiments of the invention could be made without departing from the scope of this invention, it is intended that all matter contained in the above description or shown in the accompanying drawing shall be interpreted as illustrative and not in a limiting sense.

The invention described herein may be manufactured and used by or for the Government of the United States of America for governmental purposes without the payment of any royalties thereon or therefor.

Having described my invention, what I claim as new and desire to secure by Letters Patent of the United States is:

1. An X-ray spectrometer comprising, a source of X-rays consisting of an X-ray tube, a specimen holder and a detector, said specimen holder being disposed on a pivot member, the pivot axis of which lies in, and passes through the center of, the face-plane of the anode of said X-ray tube, and said detector being disposed on a support which is rigidly mounted on said pivot member.

2. In an X-ray spectrometer having an X-ray tube equipped with a plane-face anode, said plane-face being substantially perpendicular to the longitudinal axis of said anode and a specimen holder, means for converting the anode of said tube from an area-source into effectively a line-source, comprising, a support for said specimen holder pivotally disposed for movement about an axis lying in, and passing through the center of, the face-plane of the anode of said tube, and means for regulating and indicating the pivotal position of said support and thereby the angle subtended by said support and said anode face.

3. In X-ray spectrometer apparatus, the combination of, an X-ray tube having a plane-face anode substantially perpendicular to the direction of exciting radiation from the cathode of said tube, a specimen holder rotatable through 90° mounted through its axis of rotation on a pivot member, said member having for its pivot axis an element lying in, and passing through the center of the face-plane of said anode, a variable-width slit assembly mounted on said pivot member, a detector support rigidly mounted on said pivot member and moveable therewith, and a detector disposed on said support and moveable with respect thereto through an arc of 90°, said arc being that swept out by the major axis of said specimen holder during its rotation, with means for regulating and indicating the pivotal position of said pivot member.

HERBERT FRIEDMAN.

REFERENCES CITED

The following references are of record in the file of this patent:

UNITED STATES PATENTS

| Number | Name | Date |
|---|---|---|
| 1,589,833 | Behnken et al. | June 22, 1926 |
| 2,025,488 | Yap | Dec. 24, 1935 |
| 2,145,686 | Dessauer | Jan. 31, 1939 |
| 2,383,764 | Bond | Aug. 28, 1945 |

OTHER REFERENCES

The Construction and Use of X-ray Powder Cameras, by A. J. Bradley et al., Journal Scientific Instruments, vol. 18, 1941, p. 218.